(12) United States Patent
Schut

(10) Patent No.: US 7,115,675 B2
(45) Date of Patent: *Oct. 3, 2006

(54) UNDER-/OVERPRINTING FLUID COMPONENT FOR ENHANCING INK STABILITY IN PRINTING

(75) Inventor: David M. Schut, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/841,334

(22) Filed: May 7, 2004

(65) Prior Publication Data

US 2004/0210000 A1   Oct. 21, 2004

Related U.S. Application Data

(63) Continuation of application No. 09/866,059, filed on May 25, 2001, now abandoned.

(51) Int. Cl.
*C08L 53/00* (2006.01)
*C08L 29/04* (2006.01)
*C08L 29/06* (2006.01)

(52) U.S. Cl. .................. 523/122; 106/31.13; 523/160; 523/161; 524/502; 524/503; 524/505

(58) Field of Classification Search ................ 523/122, 523/160, 161; 106/51.13; 524/502, 503
See application file for complete search history.

(56) References Cited

U.S. PATENT DOCUMENTS

| 4,002,589 A | 1/1977 | Farley et al. |
| 5,695,603 A | 12/1997 | Shiba et al. |
| 6,096,826 A | 8/2000 | Rabasco et al. |

FOREIGN PATENT DOCUMENTS

| EP | 0 328 375 | 8/1989 |
| GB | 851059 | 10/1960 |
| GB | 857798 | 1/1961 |
| JP | 59-189113 | 10/1984 |
| WO | WO 00/43428 | 7/2000 |
| WO | WO 00/43440 | 7/2000 |

*Primary Examiner*—Ana Woodward

(57) ABSTRACT

A method of improving ink stability. A block co-polymer is added to either an under-/overprinting vehicle or an ink vehicle. The polymer increases chemical interactions between the ink the print media. The under-/overprinting vehicle and the ink vehicle interact through electrostatic interactions while the polymer increases smearfastness by interacting with the print media through non-covalent interactions.

12 Claims, 1 Drawing Sheet

UNDER-/OVERPRINTING FLUID COMPONENT FOR ENHANCING INK STABILITY IN PRINTING

This application claims the priority and is a continuation of U.S. patent application Ser. No. 09/866,059, filed May 25, 2001 now abandoned, the entire contents of which are incorporated herein by reference.

FILED OF THE INVENTION

This invention pertains to a chemical method for improving ink jet print stability, and, more specifically, to an additive that enhances the waterfastness, mechanical and physi-chemical stability of printed inks.

BACKGROUND OF THE INVENTION

Durability in thermal inkjet printing includes three factors, smearfastness, smudgefastness, and waterfastness. Smearfastness and smudgefastness are measures of the printed ink's resistance to physi-chemical and physical abrasion, respectively. Waterfastness is a measure of the insolubility of the ink after printing. Despite extensive research, inkjet prints are prone to smudging and bleeding. As a result, it is desirable to have an ink formulation that, when included in an ink or employed as an underprinting and/or overprinting vehicle, increases the durability of the printed ink.

SUMMARY OF THE INVENTION

In one aspect, the invention is an additive for a printing vehicle comprising a block co-polymer. The block co-polymer includes a first block comprising a pendant group selected to interact with a media substrate via hydrogen bonding, $\pi$-bond interactions, Van der Walls forces and/or any combination of the above; and a second block comprising an acidic, basic, charged or chargeable moiety. The first block comprises at least 6 pendant groups with which to interact with the media and the second block comprises at least 6 acidic, basic, charged or chargeable moieties to interact with the dye, underprinting or overprinting vehicle components. Depending on the type of polymer used, the molecular weight of these polymers is between 500 and 500,000. A linker group, which may comprise at least one mer of polymerized vinyl benzoate, may be interposed between the first and second blocks.

The pendant group in the first block may comprise a hydroxyl group, and a linker group may be interposed between the hydroxyl group and the polymer backbone. In addition, the first block may comprise poly(vinyl alcohol), poly(allyl alcohol), poly(vinyl phenol), poly(alkyl styrene) and poly(vinyl alkyl).

The second block may comprise poly(ethylene imine), methylated poly(ethylene imine), poly(diallyldimethylamino chloride), polymerized styrene maleic anhydride, or a polymer having a carboxylated pendant group. The carboxylated pendant group may be separated from the polymer backbone by a linker group comprising an aliphatic moiety, an aromatic moiety, or both.

BRIEF DESCRIPTION OF THE DRAWING

The invention is described with reference to the several figures of the drawing, in which.

DETAILED DESCRIPTION

Figure 1:
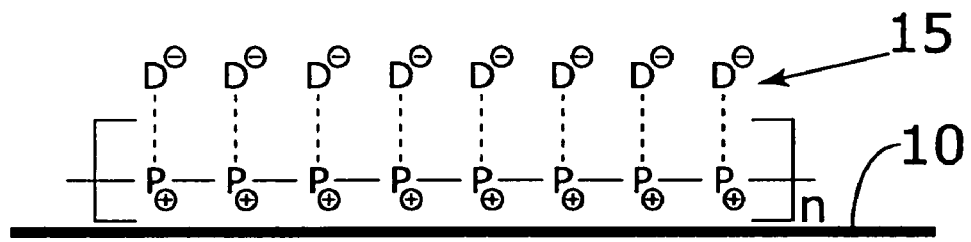
FIG. 1 is a schematic of the interaction of prior art ink and underprinting vehicles.

The invention exploits chemical interactions between an ink and the surface of a printed substrate (i.e., paper) to both increase the adhesion of the ink to the substrate and the internal cohesion of the ink. Typically, an ink vehicle containing a dye is printed on top of an underprinting (fixer) vehicle in order to induce waterfastness characteristics to the printed material. While this interaction does increase waterfastness by inducing the ink to become insoluble in water, it does not enhance the interaction between the ink and the media—allowing it to become even more susceptible to physical abrasion and/or physi-chemical abrasion. This occurs because the dye is insolubilized closer to the surface of the media where it becomes much more susceptible to these two types of failures. FIG. 1 shows the interaction of the dye D with the underprinting polymer P through electrostatic interactions. As can be seen in this schematic, there is no interaction of the media with the dye or with the fixer.

Figure 2:
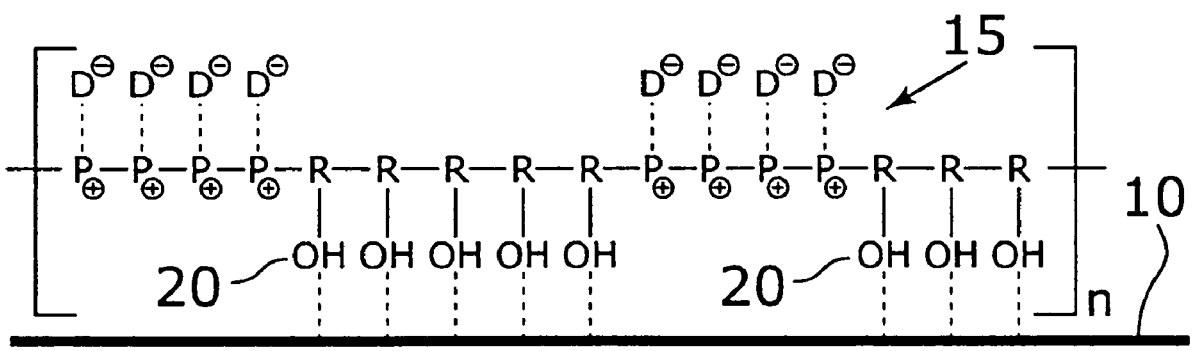
FIG. 2 is a schematic of the interaction of an underprinting vehicle according to the invention with a substrate and an ink vehicle.

In the following example, either the under-/overprinting fluid or the combination of the ink and an under-/overprinting fluid contains a polymer to enhance the interaction of the dye/fixer complex with the media on which it was printed. By adding a functionality 20 that interacts chemically with the substrate (media), for example, through hydrogen bonding interactions, the complex shown in FIG. 1 demonstrates increased durability as shown in FIG. 2. The functionality may be formulated as a block co-polymer with the polymer in either the under-/overprinting vehicle or the ink vehicle.

Exemplary hydrogen bonding blocks include poly(vinyl alcohol) and other polymers with hydroxylated side chains. The hydroxyl group need not be immediately adjacent to the polymer backbone but may be separated from it by a linker group such as an aliphatic or aromatic chain. For example, the block may comprise poly(allyl alcohol) or poly(vinyl phenol). Longer alkyl chains or mixed alkyl-aromatic chains may also be used as linker groups. Unsaturated linker groups may be used to promote chain branching. The polymer backbone need not be a aliphatic polymer but may be substituted or include double bonds, which may promote chain branching. One skilled in the art will recognize that a wide variety of hydroxylated polymers may be employed.

For printing on papers with hydrophobic coatings such as polystyrene-co-butadiene, a block co-polymer with a hydrophobic moiety is preferred. Hydrophobic polymers include polystyrene and its derivatives, especially derivatives with aliphatic chains attached to the phenyl group. While excessively long side chains may inhibit the solubility of the polymer in the vehicle, solubility can be increased without decreasing the interaction between the paper and the polymer by including an ether or other polar functionality in the chain. Aromatic groups promote $\pi$-bond interactions with the coating, while aliphatic functionalities engage in Van der Walls interactions with the substrate coating. One skilled in the art will readily identify a variety of suitable polymers for use with the invention as a hydrophobic block.

As noted above, one block of either the ink or the under-/overprinting block co-polymers includes a functionality that facilitates electrostatic interactions between them. The "electrostatic interaction block" and the "substrate interaction block" should each be sufficiently large to enable an energetic interaction between the polymer and the substrate, the dye, or the under-/overprinting polymer. The under-/overprinting polymer typically includes a positively charged polymer, such as poly(ethylene imine) (PEI). However, any polymer capable of stable retaining a positive charge is suitable for use in the electrostatic interaction block. For example, an amine may be included as a side chain on the polymer, either directly attached to the backbone or tethered via an aromatic or aliphatic linker. Other appropriate polymers include methylated PEI and poly(diallyldimethylamino chloride).

The ink polymer typically includes a negatively charged polymer with a carboxylated side chain, for example, poly(vinyl acetate). Exemplary side chains include a linker with a carboxylate end group. Alternatively, cyclic molecules such as maleic anhydride may be incorporated into the polymer backbone. For example, SMA™-1000H, from ELF-ATOCHEM, includes short block of polystyrene (1–3 mers) punctuated by a maleic anhydride mer. Benzoates and sulfonates may also be used as side chains, and polysulfonamides may be incorporated into the polymers as well. Sulfonates may also be exploited to increase the solubility of the polymer. One skilled in the art will recognize a wide variety of carboxylated polymers that may be used. It is preferable that the polymers have a pKa lower than 6.

EXAMPLES

Example 1

Under-/Overprinting Vehicle Co-Block Polymer for Plain Paper

An exemplary under-/overprinting vehicle includes a block co-polymer with the structure

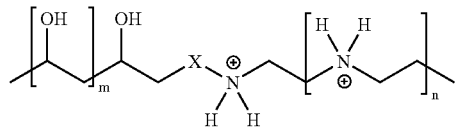

where m and n are both between 5 and 13, providing between 6 and 14 mers in each block, and X is an optional linker molecule, for example, a carbon atom or a polyethylene linker. The total molecular weight should be between 500–10,000. Typical aqueous under-/overprinting and ink vehicle formulations are shown in Table 1 (all values are weight percent). The printed ink may be overprinted or underprinted with a solution of borate, boric acid, or other multivalent counteranions.

Both under-/overprinting and ink vehicles include a humectant, an anti-cockle reagent, various surfactants, and a biocide. A humectant hydrogen bonds with water in the vehicle to decrease evaporation during storage and to maintain colorant or ink vehicle component solubility during drop formation on the print head. Typical humectants include diols, triols, polyols, and various heavy alcohols. Suitable diols include ethanediols, propanediols, butanediols, hexanediols, heptanediols, and octanediols. Typical triols include propanetriols such as 2-ethyl2-hydroxymethyl-1,3-propanediol and ethylhydroxypropanediol. Glycol ethers, thioglycol ethers, polyalkylene glycols (e.g., diethylene glycol, dipropylene glycol, PEG 200 and larger polymeric glycols) may also be employed. An anti-cockle reagent prevent buckling of the substrate as it is wet by the ink. Various nitrogen-containing ketones, including 2-pyrrolidinone, M-methyl2-pyrrolidinone, 1,3-dimethylimidazolidinone, octylpyrrolidinone, thioethers, and sulfur containing heterocycles such as sulfolane may be exploited as anti-cockle agents. A variety of biocides suitable for inkjet printing are well known in the art and include NUOSEPT™ (Hals America), PROXEL™ GXL (Avecia, Inc.), and glutaraldehyde.

Appropriate surfactants are incorporated into both under-/overprinting and ink vehicles. Cationic surfactants may be incorporated into the under-/overprinting vehicle when it includes a polymer according to the invention. Typical cationic surfactants include betaines, quaternary ammonium compounds, cationic amine oxides, and imidazoline surfactants. Anionic surfactants may be incorporated into the ink vehicle when it includes a polymer according to the invention. Typical anionic surfactants include alkyldiphenyloxide surfactants and sulfonated surfactants. Non-ionic surfactants may be used in both under-/overprinting and ink vehicles. Typical non-ionic surfactants include secondary alcohol ethyoxylates, non-ionic fluoro surfactants, non-ionic fatty acid ethyoxylate surfactants, and acetylenic polyethylene oxide surfactants. Appropriate surfactants are well known to those skilled in the art and are commonly available from chemical suppliers.

TABLE 1

| Component | Under-/Overprinting | | Ink | |
|---|---|---|---|---|
| | 1 | 2 | 1 | 2 |
| humectant (diol, etc.) | 5 | 5 | 10 | 10 |
| anti-cockle reagent | 10 | 10 | 10 | 10 |
| non-ionic surfactant | 2 | 2 | 1 | 1 |
| anionic surfactant | — | — | 1 | 1 |
| block co-polymer | 3 | 3 | — | — |
| boric acid | — | — | — | 5 |
| biocide | 0.2 | 0.2 | 0.2 | 0.2 |
| water | balance | balance | balance | balance |
| colorant | — | — | present | present |
| pH | 4.0 | 4.0 | 8.0 | 8.0 |

Example 2

Ink Vehicle Co-Block Polymer for Plain Paper

An exemplary ink vehicle includes a block co-polymer with the structure

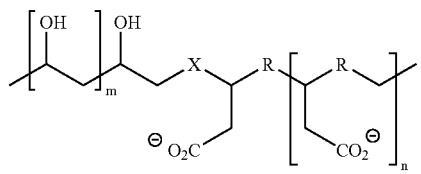

where m and n are between 5 and 13, providing between 6 and 14 mers in each block. The molecular weight is preferably between 500 and 10,000. Any short aromatic or aliphatic linker moiety is suitable for X, and any chain polymerizabale organic group is suitable for R as well. Polymerized maleic anhydride is preferable for the carboxylated portion, and SMA™-1000H may be used for the carboxylated portion of the chain. Typical formulations for under-/overprinting and ink vehicles exploiting this block co-polymer are in Table 2 (all values are weight percent). The printed ink may be underprinted and/or overprinted with a solution of borate, boric acid as well as any multivalent countercation such as $Mg^{2+}$, $Ca^{2+}$ and $Ti^{4+}$.

TABLE 2

| Component | Under-/Overprinting | | Ink | |
|---|---|---|---|---|
| | 1 | 2 | 1 | 2 |
| humectant (diol, etc.) | 10 | 10 | 5 | 5 |
| anti-cockle reagent | 10 | 10 | 10 | 10 |
| non-ionic surfactant | 2 | 2 | 1 | 1 |
| anionic surfactant | — | — | 1 | 1 |
| block co-polymer | — | — | 4 | 4 |
| PEI(MW = 800) | 5 | 5 | — | — |
| biocide | 0.2 | 0.2 | 0.2 | 0.2 |
| water | balance | balance | balance | balance |
| colorant | — | — | present | present |
| pH | 4.0 | 4.0 | 8.0 | 8.0 |

Example 3

Under-/Overprinting Vehicle Co-Block Polymer for Plain Paper

It is not necessary for the block co-polymers to be straight chain polymers; they may be branched. An exemplary polymer for use in an under-/overprinting vehicle is

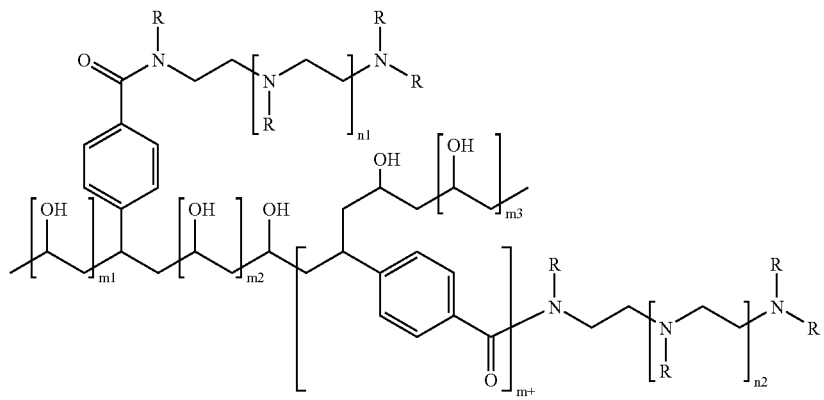

where the number of mars in each block should be 6 or greater, m+ is a single mer of vinyl benzoate, and the molecular weight Is between 1,000 and 500,000. One skilled In the art will recognize that the molecular weight should be controlled to maintain solubility of the polymer in the vehicle and that optimal molecular weights will vary with monomer size and composition. A vinyl benzoate group is used as a linker group between the poly(imine) and poly(alcohol) blocks. This group enables branching of the chain. R may be a hydrogen, a small organic moiety, or a poly(imine), enabling further branching of the polymer. These polymers are suitable for plain papers or papers having hydrophilic coatings. The poly(alcohol) portions of the polymer form hydrogen bonds with the paper, while the poly(imine) portions interact electrostatically with the dye (as shown in FIG. 2).

Example 4

Ink Vehicle Co-Block Polymer for Plain Paper

An exemplary polymer for use in an ink vehicle is

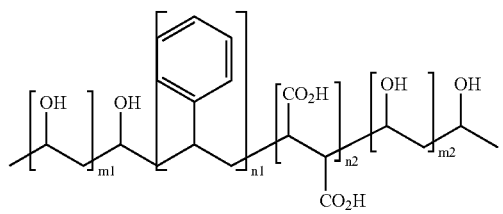

The poly(alcohol) portion interacts with the paper, while the poly(carboxylate) portion engages a poly(imine) under-/overprinting vehicle component electrostatically. The polyol blocks should have at least 6 mers, while the polyacid block should have at least 3, providing 6 acid functionalities. The molecular weight should be between 1,000 and 500,000. Larger molecular weights may cause reliability problems during ink drop ejection. Use of a difunctional carboxylate is not required—if a monofunctional carboxylate is used, the minimum block size should be increased. In addition, the difunctional carboxylate shown enables further chain branching in the polymer.

Example 5

Under-/Overprinting Vehicle Co-Block Polymer for Hydrophobically Coated Media

If the substrate surface is hydrophobic, an aromatic or aliphatic block should be employed to interact with the surface via Van der Walls or π-bond interactions. An exemplary block co-polymer for use in an under-/overprinting vehicle is

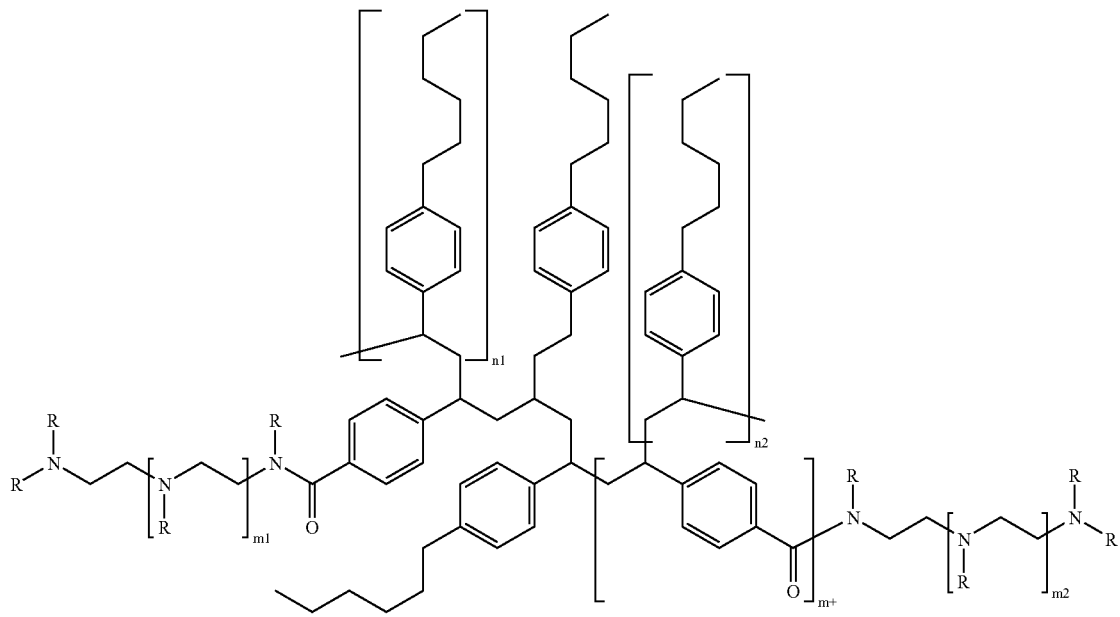

The poly(imine) groups facilitate adhesion of the ink through electrostatic interactions, while the phenylhexane side chains stabilize the dye/fixer complex against physical abrasion. Each block should have at least 6 mers, while m+ is a single mer linking the poly(imine) block to the poly (phenylhexane) block. The m+mer also facilitates chain branching. The molecular weight should be between 1,000 and 500,000.

Example 6

Ink Vehicle Co-Block Polymer for Hydrophobically Coated Media

The poly(phenylhexane) block may be combined with a poly(carboxylate) block to form a polymer for use in an ink vehicle. An exemplary block co-polymer employing hydrophobic and acidic blocks is The hydrophobic block should have at least 6 mers, while the polyacid blocks should have at least 3, providing 6 acid functionalities. If a monofunctional carboxylate is used, the minimum number of mers should be increased. The molecular weight should be between 1,000 and 500,000.

Example 7

Synthesis

The polymers of the invention are typically synthesized as individual blocks that are combined through condensation reactions. The exact composition is controlled by the amount of the reactants used, the reaction time, and other variables well known and easily manipulated by those skilled in the art. These variables may be optimized for a particular product.

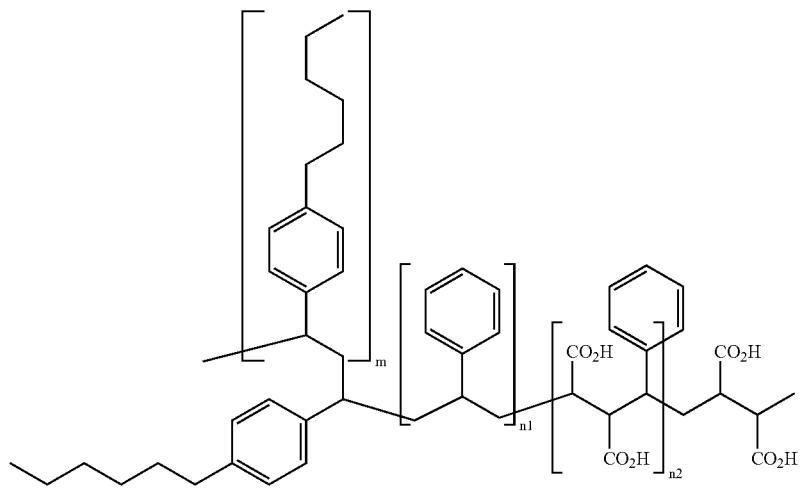

The polymer precursors, especially those of Examples 3–6, are synthesized according to standard emulsion polymerization techniques. A surfactant, a monomer, and an initiator are added in that order to about 80% of a predetermined quantity of water and stirred to form an emulsion. The remaining water and an equal amount of the emulsion are placed in a reaction flask equipped with a paddle stirrer, an addition flask, and a reflux condenser, while the rest is placed in the addition funnel. The reaction flask is heated in an oil bath or other heater until refluxing is observed, and the remaining emulsion is gradually added to the reaction flask. The exothermic polymerization is controlled by adjusting the rate at which the monomer is added and the temperature of the oil bath. After all the emulsion has been added to the flask, the temperature is raised to 95–97° C. A small amount of an initiator is added to the reaction mixture to ensure complete conversion of the monomer and the mixture stirred for about an hour. While still stirring, the reaction mixture is cooled to room temperature and then strained through a fine mesh to remove any gums that may have formed during the reaction.

Example 8

Synthesis of a Polyol Precursor

The polyol block of the polymer of Example 3 may be synthesized as follows: 400 mL deionized water, 25 g Triton X-200 (a surfactant), 250 g vinyl acetate (monomer), 1 g 4-ethenyl methylbenzoate, and 0.001 g t-butyl hydroperoxide (70%) are combined as above to form an acetate ester precursor to the polyol. The acetate groups, in addition to the methyl groups on the benzoate ester, are hydrolyzed by refluxing the polymer in water for about two hours at about pH 4 while removing the resulting acetic acid and methanol under reduced pressure. The resulting precursor

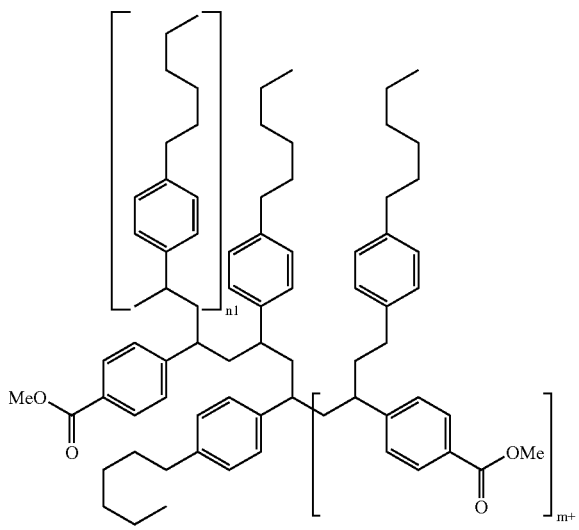

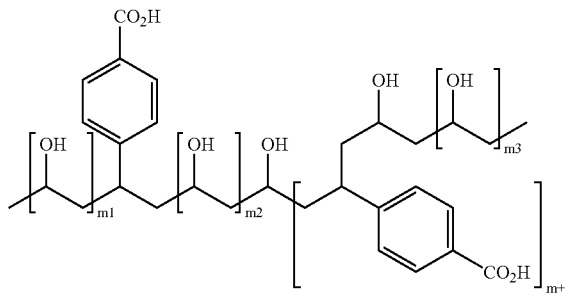

is combined with PEI via the benzoate groups to form the polymer of Example 3, or with some other polyamine, through a condensation reaction.

Example 9

Synthesis of a Hydrophobic Precursor

The hydrophobic block of the polymer of Example 4 may be synthesized by substituting 4-hexylstyrene for vinyl acetate in the reaction of Example 8. Because the solubility of the resulting precursor is low in aqueous solution, it is preferable to co-polymerize 4-ethenyl benzenesulfonate to increase the solubility of the precursor. The precursor is refluxed with a polyamine and the resulting methanol removed to produce the final polymer. The composition of the polymer may be varied to achieve desired properties.

Example 9

Synthesis of a Polyol

The polyol block of Example 5 may be synthesized by replacing 150 g of vinyl acetate with 100 g styrene maleic anhydride in the reaction described in Example 3 to produce the following acetate ester precursor.

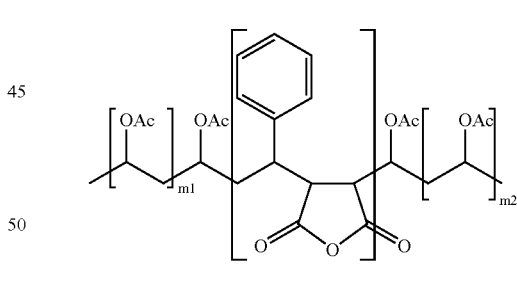

The ester is refluxed in an aqueous solution of about pH 4 for two hours to hydrolyze the acetate group and the resulting polyol combines with a polyamine such as PEI by opening the anhydride ring.

Example 10

Synthesis of a Hydrophobic Precursor

The hydrophobic block of Example 6 may be synthesized by replacing vinyl acetate with 100 g of 4-hexylstyrene and 100 g styrene maleic anhydride in the synthesis of Example 3. It is preferable to co-polymerize these materials with 4-ethenyl benzenesulfonate to increase the solubility of the resulting polymer precursor:

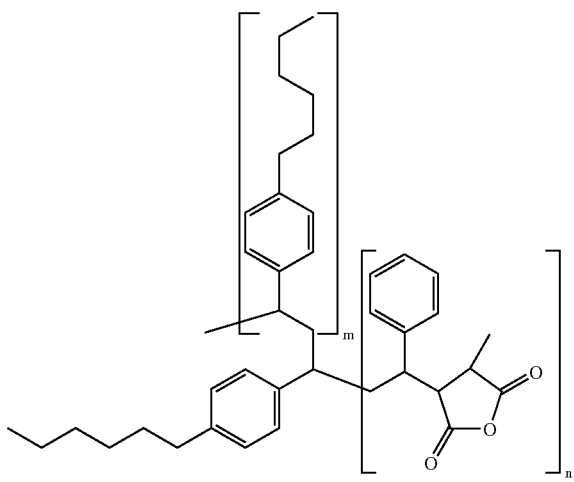

The anhydride ring is hydrolyzed to open the ring and produce a diacid by refluxing the polymer in water for about two hours at about pH 4. The resulting polymer precursor is combined with a polyamine by opening the anhydride ring to form a co-polymer according to the invention.

Other embodiments of the invention will be apparent to those skilled in the art from a consideration of the specification or practice of the invention disclosed herein. It is intended that the specification and examples be considered as exemplary only, with the true scope of the invention being indicated by the following claims.

What is claimed is:

1. A printing vehicle for ink-jet printing, comprising:
   a humectant;
   an anti-cockle reagent;
   a surfactant;
   a biocide; and
   a block co-polymer that is stable in the printing vehicle, the block co-polymer comprising:
   a first block comprising a pendant group having a hydroxyl group selected to interact with a substrate via an interaction selected from the group consisting of hydrogen bonding, pi-bond interactions, Van der Waals forces, and combinations thereof; and
   a second block comprising at least 6 groups including a polymer selected from the group consisting of poly (ethylene imine), methylated poly(ethylene imine), poly(diallyldimethylamino chloride), polymerized styrene maleic anhydride, and a polymer having a pendant group that includes a carboxylic acid,
   wherein the first black comprises at least 6 pendant groups.

2. The printing vehicle of claim 1, wherein the block co-polymer has a molecular weight between 500 and 500,000.

3. The printing vehicle of claim 2, wherein the block co-polymer has a molecular weight between 500 and 10,000.

4. The printing vehicle of claim 2, wherein the block co-polymer has a molecular weight between 1,000 and 500,000.

5. The printing vehicle of claim 1, wherein the first block comprises poly(vinyl alcohol), poly(allyl alcohol), or poly (vinyl phenol).

6. The printing vehicle of claim 1, wherein the first block comprises a linker group interposed between the hydroxyl group and the polymer backbone.

7. The printing vehicle of claim 1, wherein the polymer having the pendant group that includes a carboxylic acid further comprises a linker group, wherein the linker group comprises an aliphatic moiety, an aromatic moiety, or both.

8. The printing vehicle of claim 1, wherein the block co-polymer further comprises a linker group separating the first and second blocks.

9. The printing vehicle of claim 8, wherein the linker group comprises at least one mer of polymerized vinyl benzoate.

10. The printing vehicle of claim 1, wherein the block co-polymer comprises,

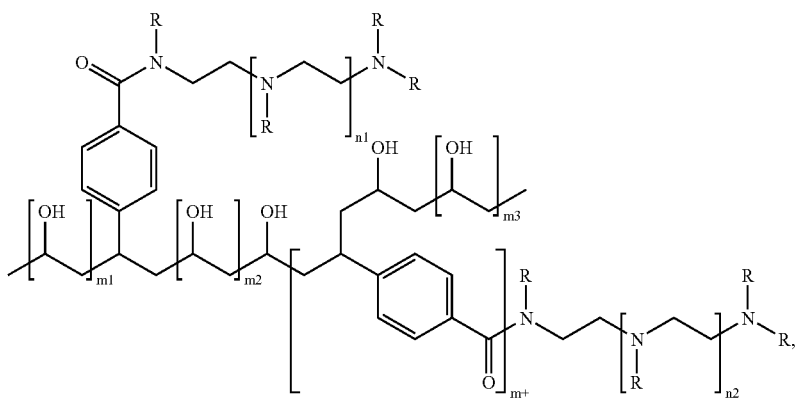

wherein m1, m2, m3, n1, and n2 are at least 6, m+ is 1, R is a hydrogen, a small organic moiety, or a poly (imine), and the molecular weight is between 1,000 and 500,000.

11. The printing vehicle of claim 1, wherein the block co-polymer comprises,

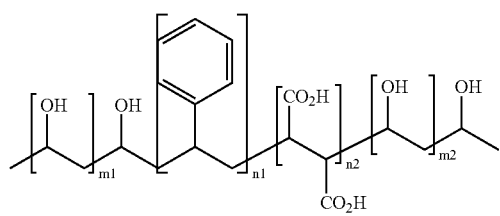
wherein m1 and m2 are each is at least 6, n1 is at least 2, n2 is at least 3 and the molecular weight is between 1,000 and 500,000.
12. The printing vehicle of claim 1, wherein the printing vehicle is an ink and wherein the printing vehicle further comprises a colorant.
* * * * *

UNITED STATES PATENT AND TRADEMARK OFFICE
CERTIFICATE OF CORRECTION

PATENT NO.        : 7,115,675 B2
APPLICATION NO.   : 10/841334
DATED             : October 3, 2006
INVENTOR(S)       : Schut Page 1 of 1

It is certified that error appears in the above-identified patent and that said Letters Patent is hereby corrected as shown below:

Col. 5 (line 58), delete "mars" and insert therefor --mers--.

Col. 5 (line 60), delete "Is" and insert therefor --is--.

Signed and Sealed this

Fourteenth Day of August, 2007

JON W. DUDAS
*Director of the United States Patent and Trademark Office*